UNITED STATES PATENT OFFICE.

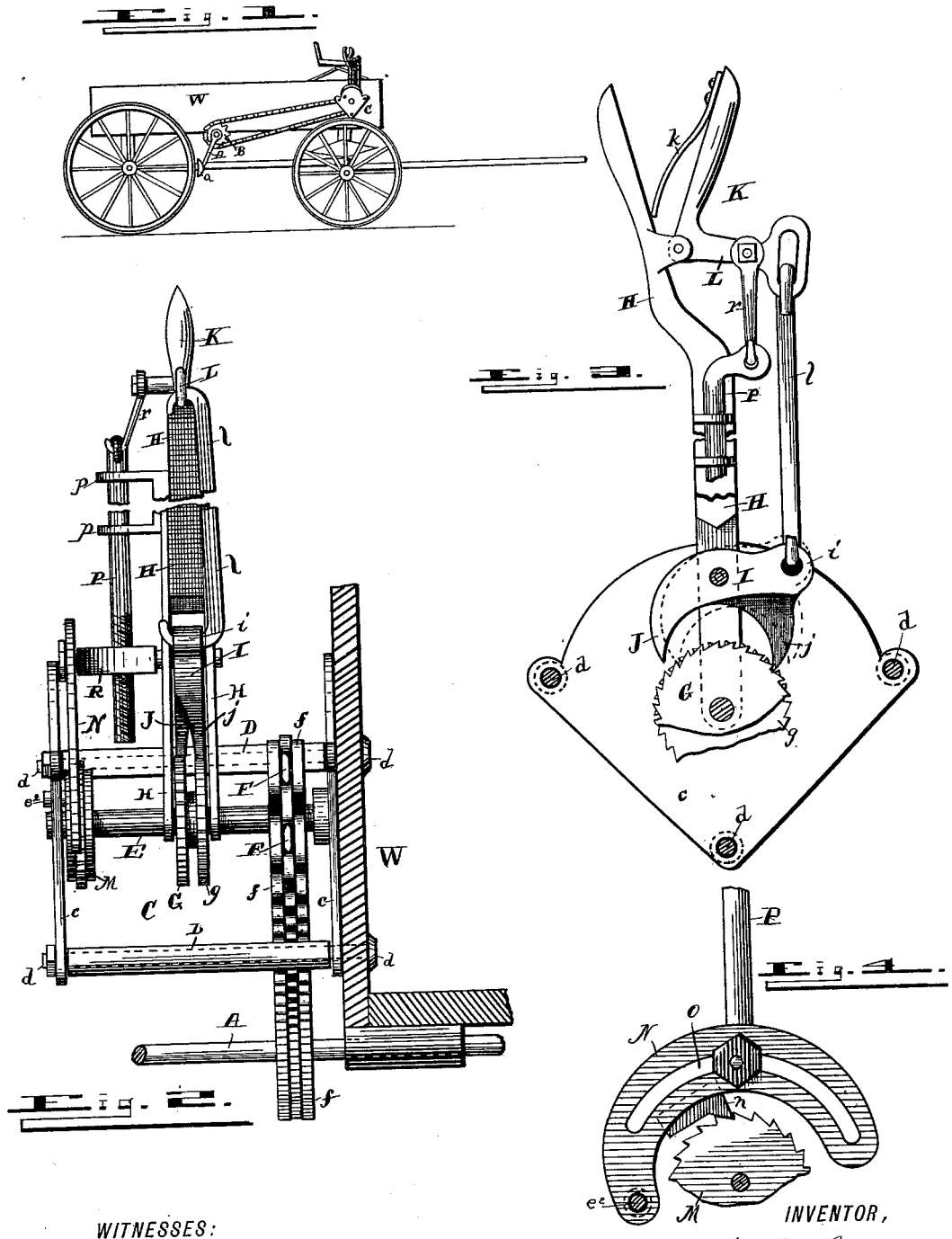
(No Model.)
G. W. BARNES.
BRAKE LEVER.
No. 403,983. Patented May 28, 1889.
WITNESSES:
P. L. Brooks
O. M. Seville
INVENTOR,
Geo. W. Barnes.
BY Alexander
ATTORNEY.

GEORGE W. BARNES, OF PHILIPPI, WEST VIRGINIA.

BRAKE-LEVER.

SPECIFICATION forming part of Letters Patent No. 403,983, dated May 28, 1889.

Application filed January 24, 1889. Serial No. 297,486. (No model.)

*To all whom it may concern:*

Be it known that I, GEORGE W. BARNES, of Philippi, in the State of West Virginia, have invented certain new and useful Improvements in Brake-Levers; and I do hereby declare that the following is a full, clear, and exact description thereof, reference being had to the accompanying drawings, and to the letters of reference marked thereon, which form part of this specification, in which—

Figure 1 is a side view of the device applied to a wagon. Fig. 2 is an end view of the brake-levers; Fig. 3, a detail sectional view of the double ratchet and dog; Fig. 4, a detail of the locking-plate.

This invention is an improvement in brakes and brake-levers, and its object is to provide novel devices for powerfully tightening the brake-chains and for applying the brakes, as hereinafter clearly described and claimed. The brake, as shown, is applied to an ordinary road-vehicle, but the brake-levers are designed for use on railroad-cars or other wheeled vehicles.

Referring by letter to the drawings, W represents the body of an ordinary vehicle, which is provided with a transverse cranked bar, A, properly journaled beneath the body in front of one pair of wheels, and carrying on its ends brake-shoes $a$, which are applied by rotating the bar in one direction and released by turning it in the opposite direction, as is evident.

B designates a sprocket-wheel mounted on bar A at one side of the body, and hereinafter referred to. On the front end of the body on the side with wheel B are mounted my brake-operating devices, which are as follows:

C designates a frame consisting of two opposite plates, $c\ c$, connected at three or more points near their peripheries by legs D D, which may be tubular, and through which pass bolts $d\ d$, that also pass through the side of the body and secure the frame in position, as shown.

E designates a shaft journaled about centrally between and in plates $c\ c$, and F designates a sprocket-wheel on said shaft near the inner plate $c$ and in line with sprocket B, and $f$ is a link chain connecting said wheels and transmitting motion from one to the other.

G $g$ are two oppositely-toothed ratchet-wheels secured about centrally on shaft E, and might be made integral, if desired, or rigidly connected.

H is a lever, preferably bifurcated at its lower end and mounted loosely on shaft E over ratchets G $g$.

I designates a crescent-shaped dog pivoted about centrally on a pin passing through the bifurcated end of lever H and above the ratchets. This dog has its rear tooth, J, bent to engage only the teeth of ratchet G, while its front tooth, $j$, is bent to engage only the teeth of ratchet $g$.

$i$ is a perforated ear projecting from the front upper edge of dog I, by which the same is oscillated to throw either of its teeth into engagement with its corresponding ratchet and to simultaneously disengage the opposite tooth. On the upper end of lever H is pivoted a cranked grip-iron, K, the vertical hand-piece of which carries a spring, $k$, that bears against the adjoining face of the hand-piece of lever H, as usual. The end of the horizontal arm L of iron K is connected by a link-rod, $l$, with the ear $i$ of dog I, so that by operating the grip the dog can be oscillated to disengage its front tooth from ratchet $g$ and throw its rear tooth, J, into engagement with ratchet G, but as soon as released spring $k$ shifts the crank-iron and causes tooth $j$ to again engage ratchet $g$.

M is a ratchet-wheel on the outer end of shaft E, toothed similarly to wheel $g$ and engaged by a toothed locking-plate, N, pivoted at one end on plate $e$, as indicated at $e^2$ in the drawings. This plate N is curved, and has a curved slot, O, therein, which slot, when the tooth is engaged with ratchet M, is about concentric to the shaft E.

P is a rod playing through eyes $p\ p$ on the side of lever H next plate N, and having its lower end threaded and carrying a catch-block, R, which projects through slot O of plate N and reciprocates therein when lever H is shifted. The upper end of rod P is connected by a link, $r$, with the end of arm $k$ of iron K, so that it is lifted simultaneously with the disengagement of tooth $j$ of dog I and ratchet $g$. The lifting of rod P causes it to lift plate N through block R and slot O, and thus disengages tooth $n$ and ratchet M.

The operation is as follows: The brake-shoes being disengaged, lever H is operated, causing dog I to engage ratchet g and rotate shaft E, and the motion of said shaft is transmitted through the sprockets and chain to bar A, and the brakes are applied as tightly as may be necessary to lock the wheels, and the plate N, engaging ratchet M, prevents release of the brakes. To release the brakes, it is necessary to grasp iron K, and thus disengage dog I and ratchet g and lift rod P, disengaging plate N and ratchet M. Then, if it is desired to withdraw the brake-shoes clear of the wheels, as is desirable in road-vehicles on muddy roads, the lever H is operated, while iron K is held, and thus dog I engages ratchet G and rotates shaft E in a contrary direction, and through the sprockets and chain turns bar A backward, throwing the brake-shoes entirely away from the wheels.

It is obvious that the frame and its ratchets and lever and shaft could be employed in various situations, and that instead of a sprocket-chain an ordinary chain or rope could be used and tightened by winding round shaft E, thus rendering the brake-lever devices applicable for many useful purposes.

Having thus described my invention, what I claim as new is—

1. The combination of a shaft having oppositely-toothed ratchet-wheels and the lever and shifting dog for operating said ratchets, with the locking ratchet-wheel and its locking-plate having a curved slot, and the rod and its operating devices connected to said lever and engaging the slot in said plate, for the purpose and substantially as specified.

2. The combination of the shaft, the ratchets thereon, the operating-lever and its adjustable dog for said ratchets, and the locking-ratchet and curved slotted locking-plate thereof, with the brake-bar and the connections between the said shaft and bar, substantially as described.

3. The combination of the shaft and its operating devices, with a locking-ratchet on said shaft, the toothed plate engaging said ratchet having a curved slot concentric to said shaft, and the devices engaging said plate, all substantially as described.

4. The combination of the brake-bar, its brake-shoes, and sprocket-wheel, with the shaft, its opposite ratchet-wheels and operating-lever engaging said ratchets, and the locking ratchet and plate, the sprocket-wheel on said shaft, and the chain connecting said sprocket-wheel with the wheel on the brake-bar, substantially as set forth.

5. The combination of the shaft, the opposite toothed ratchet-wheels thereon, the lever carrying a shifting dog, and the devices for shifting said dog mounted on the lever, with the locking-ratchet, its locking-plate having a curved slot concentric to said shaft, and the catch-block playing in said slot, and the rod mounted on said lever engaging said block, and the connecting devices between said rod and lever, whereby the plate is shifted simultaneously with the shifting of the dog, substantially as set forth.

6. The combination of the brake-bar, the brake-shoes and sprocket-wheel on said bar, with the shaft, the sprocket-wheel thereon, the chain connecting said sprocket-wheels, the opposite toothed ratchets on said shaft, the lever, the shifting dog pivoted on said lever adapted to engage either of said ratchets, the locking-ratchet, its slotted locking-plate, and the devices, substantially as described, attached to said lever, whereby the locking plate and dog may be shifted simultaneously, substantially as and for the purpose specified.

7. The combination of the frame, the shaft journaled therein, the oppositely-toothed ratchets thereon, the bifurcated lever and shifting dog engaging said ratchets, and the locking-ratchet and toothed, curved, and slotted plate for locking said ratchet, with the crank-iron on said lever, the link connecting said iron and the shifting dog, and the link, rod, and block connecting said iron and the slotted plate, whereby the dog and plate are operated together, substantially as and for the purpose specified.

In testimony that I claim the foregoing as my own I affix my signature in presence of two witnesses.

GEO. W. BARNES.

Witnesses:
ALEX. S. BRADFORD,
J. W. SIMPSON.